United States Patent Office 2,839,893
Patented June 24, 1958

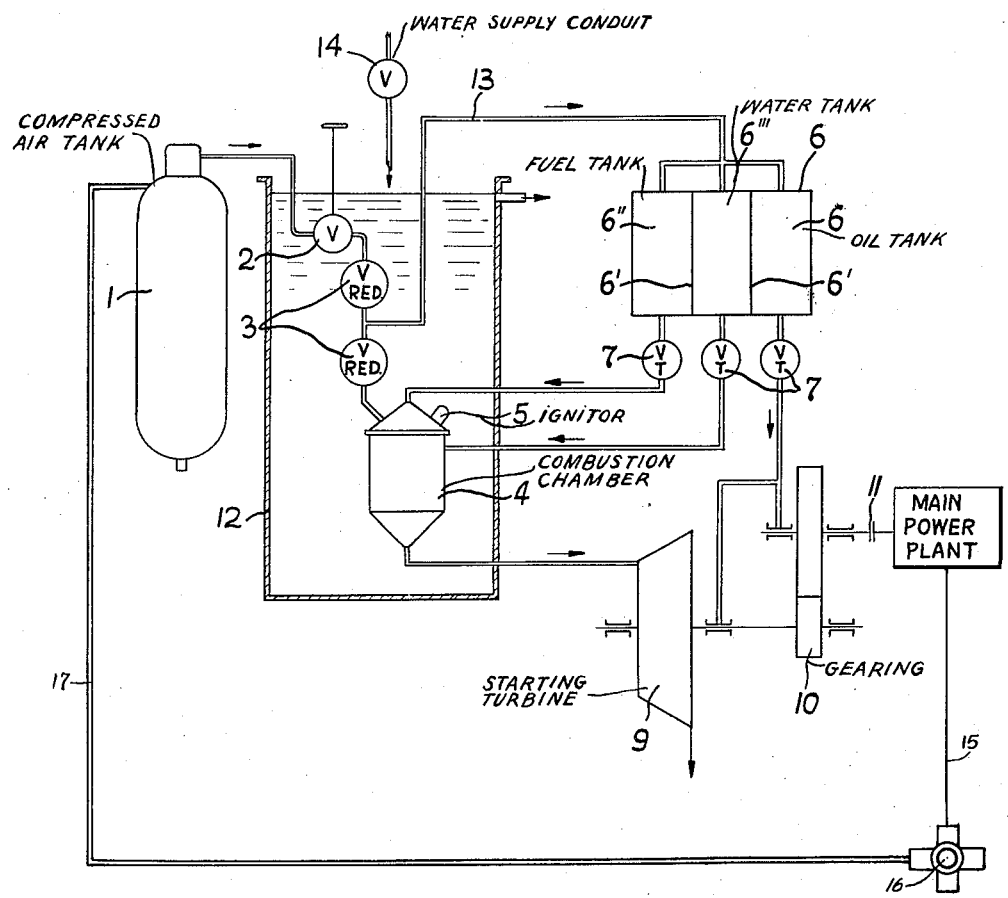

2,839,893
STARTING OF GAS TURBINE PLANTS

Max Rothemund, Augsburg, Germany, assignor to Maschinenfabrik Augsburg-Nürnberg A. G., Augsburg, Germany, a corporation of the German Republic Application October 31, 1951, Serial No. 254,006

Claims priority, application Germany November 11, 1950

2 Claims. (Cl. 60—39.14)

This invention relates to certain improvements in the starting of gas turbine plants, and more particularly to self-starting apparatus for starting up gas turbine power plants.

As a rule, gas turbine plants are started in such a way that a shaft connecting a compressor and a turbine is accelerated by a separate drive or motor means from zero speed to such a speed that the air supplied by the compressor is sufficient to cover the required heat drop for idling of the plant, and effect self-sustained operation of the turbine, on combustion with the fuel supplied to the combustion chamber. A further increase of the speed is achieved by increase of the feed of fuel to the combustion chamber and thus by the turbine itself. The separate starting motor sustains the gas turbine plant in this respect. The starting motor may be switched off or disconnected when the output of the turbine is sufficient to produce the energy necessary to keep the plant in operation without external load. This state, as a rule, is reached after 8 to 10 minutes, provided that the output of the starting motor amounts to about 5 to 7% of the effective output of the plant.

In stationary plants the starting in most instances is achieved with the aid of electric motors, since electric energy is available. For mobile gas turbine power plants, for instance, railroad locomotive and the like, diesel engines are frequently used for the starting.

These well-known starting devices, such as an electric or diesel motor, have the drawback of requiring an electric power supply system for their operation, of being very expensive, of requiring a relatively large space for their accommodation and of adding a considerable amount to the total weight of the plant.

It is an object of the present invention to remove these disadvantages.

With this and further objects in view, according to the present invention self-starting auxiliary apparatus is provided which comprise an auxiliary or starting gas turbine, an auxiliary combustion chamber, and a high pressure air tank from which compressed air for combustion and for feeding fuel, etc., is supplied through a stop valve and a reducing valve. Considering, for example, an external diameter of the auxiliary or starting turbine of about 500 mms., a compressed air reservoir of about 700 litres, at a gauge pressure of 200 atmospheres, a fuel tank with a capacity of 50 litres, and a combustion chamber volume of about 3 litres, an output of the auxiliary turbine of about 500 H. P. can be maintained for a starting time of about 10 minutes. Owing to its small size and its consequent small mass, the device offers the advantage that it is able to develop its full output almost immediately after starting. This fact, in connection with its favorable torque characteristics renders it possible to start the main gas turbine plant in the shortest possible time. This advantage weighs heavily first of all in those plants where a very short starting time is important, such as in locomotives, emergency power plants and plants providing peak current output, etc. Since the time of operation of the auxiliary or starting apparatus is usually only a few minutes, the efficiency thereof is of an inferior importance, and it can be of a very simple and cheap construction.

The figure in the drawing is a diagrammatic showing of self-starting auxiliary apparatus embodying this invention.

Referring to the drawing, a compressed air reservoir 1 supplies compressed air through a check valve 2, the pressure being reduced to a constant working pressure through a reducing two-step valve 3. This air is fed to a combustion chamber 4 which may be very small. The working fluid for the engine consists of a mixture of the combustion products of fuel, air, and water. The reservoirs for fuel and water, as well as, lubricating oil, may be combined in a single storage vessel 6 subdivided by walls 6' into three separate compartments 6'', 6''', and 6'''', for receiving fuel, water, and lubricating oil, respectively. This vessel 6 as a whole is resistant to pressure, but the partition walls need not be resistant to pressure, owing to the presence of equal pressure in the three compartments. Compressed air at a pressure exceeding the operative inlet pressure of the auxiliary or starting gas turbine 9 is supplied through conduit 13 from a suitable intermediate tapping point of the reducing valve 3 to provide pressure for feeding fuel, water, and lubricant, through nozzles or throttle valves 7 set or control so as to obtain the proper feeding ratio of the three components. Fuel and water are fed to the combustion chamber 4 where the fuel is burned at the working or operating pressure with the air taken from the compressed air reservoir 1. The ignition is initiated simultaneously with the opening of the stop valve 2 by a conventional ignition device 5. In order to reduce the amount of compressed air required for operation of the plant, the combustion is carried on approximately at stoichiometric proportions of air and fuel. The water additionally fed to the combustion chamber serves to reduce the temperature of the combustion gases to an amount which is admissible for satisfactory operation of the turbine 9 located in succession thereto. The water may be evaporated and transformed into superheated steam. The mixture of combustion gas and steam serves to drive the starting turbine 9. The starting plant also comprises a transmission gear 10 and a disengageable mechanical or hydraulic clutch or coupling 11 or a free wheel device. The lubrication of the starting turbine and of the transmission gear is achieved by oil which, as mentioned above, is pressure fed by means of compressed air tapped from the reducing valve 3 to the bearings. The combustion chamber 4, the pressure reducing valve 3, and the stop valve 2 are accommodated in a reservoir 12 and surrounded by water which may be supplied into reservoir 12 through a valve controlled water supply conduit 14. In this manner the combustion chamber 4 can be cooled by the water in reservoir 12 and the excess heat thereof used to compensate for heat consumption of the expanding highly compressed air at the stop valve 2 and reducing valve 3 thus avoiding excess cooling or freezing at these valves. The reservoir 1 may be refilled with compressed air with the aid of a small air compressor which may be driven either by the main turbine plant, as indicated in the drawing by a compressor 15 driven through drive 16 from the main power plant and replenishing reservoir 1 through conduit 17 or by a small motor.

It will be understood that the starting device may also be designed so as to comprise two or more auxiliary turbines serving for starting a corresponding number of shafts of a main gas turbine plant.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In self-contained starting apparatus for starting up a gas turbine power plant and the like, the combination which comprises a gas starting turbine for supplying power to start up said plant, a combustion chamber for supplying driving gas to said starting turbine, a fuel reservoir for supplying fuel to said combustion chamber for combustion therein, a lubricating oil reservoir for supplying lubricant to said turbine, a high pressure compressed air reservoir, a supply line including pressure reducing means for supplying air under reduced pressure from said high pressure air reservoir to said fuel and oil reservoirs for pressure feeding of fuel and oil therefrom to said combustion chamber and said turbine respectively, an additional supply line including further pressure reducing means for supplying combustion air at a further reduced pressure from said air reservoir into said combustion chamber, and means for heating said pressure reducing means with heat from said combustion chamber to prevent freezing of said pressure reducing means during expansion of said air therethrough, said means for heating including a tank of liquid in which said pressure reducing means and said combustion chamber are placed for heat transfer from said combustion chamber to said pressure reducing means through said liquid.

2. In self-contained starting apparatus for starting up a gas turbine power plant and the like, the combination which comprises a gas starting turbine for supplying power to start up said plant, a combustion chamber for supplying driving gas to said starting turbine, a fuel reservoir for supplying fuel to said combustion chamber for combustion therein, a lubricating oil reservoir for supplying lubricant to said turbine, a high pressure compressed air reservoir, a supply line including pressure reducing means for supplying air under reduced pressure from said high pressure air reservoir to said fuel and oil reservoirs for pressure feeding of fuel and oil therefrom to said combustion chamber and said turbine respectively, an additional supply line including further pressure reducing means for supplying combustion air at a further reduced pressure from said air reservoir into said combustion chamber, means for heating said pressure reducing means with heat from said combustion chamber to prevent freezing of said pressure reducing means during expansion of said air therethrough, said means for heating including a tank of liquid in which said pressure reducing means and said combustion chamber are placed for heat transfer from said combustion chamber to said pressure reducing means through said liquid, and compressor means powered by said gas turbine power plant for replenishing said high pressure compressed reservoir after said power plant has been started by said gas starting turbine.

References Cited in the file of this patent

UNITED STATES PATENTS

| 943,833 | Leavitt | Dec. 21, 1909 |
| 1,008,871 | Sodeau | Nov. 14, 1911 |
| 1,022,486 | Leavitt | Apr. 9, 1912 |
| 2,055,949 | Sharp | Sept. 29, 1936 |
| 2,402,467 | Thompson | June 18, 1946 |
| 2,436,781 | White | Feb. 24, 1948 |
| 2,503,289 | Nettel | Apr. 11, 1950 |
| 2,505,798 | Skinner | May 2, 1950 |
| 2,509,942 | Sanford | May 30, 1950 |
| 2,531,411 | Davenport | Nov. 28, 1950 |
| 2,585,626 | Chilton | Feb. 12, 1952 |
| 2,599,480 | Pfenninger | June 3, 1952 |
| 2,611,239 | Briggs | Sept. 23, 1952 |
| 2,643,511 | Briggs | June 30, 1953 |
| 2,664,969 | Bjerre | Jan. 5, 1954 |

FOREIGN PATENTS

| 276,911 | Italy | Aug. 22, 1930 |